No. 723,997. PATENTED MAR. 31, 1903.
J. J. FAULKNER.
COTTON HARVESTER.
APPLICATION FILED JULY 20, 1901.
NO MODEL. 3 SHEETS—SHEET 1.
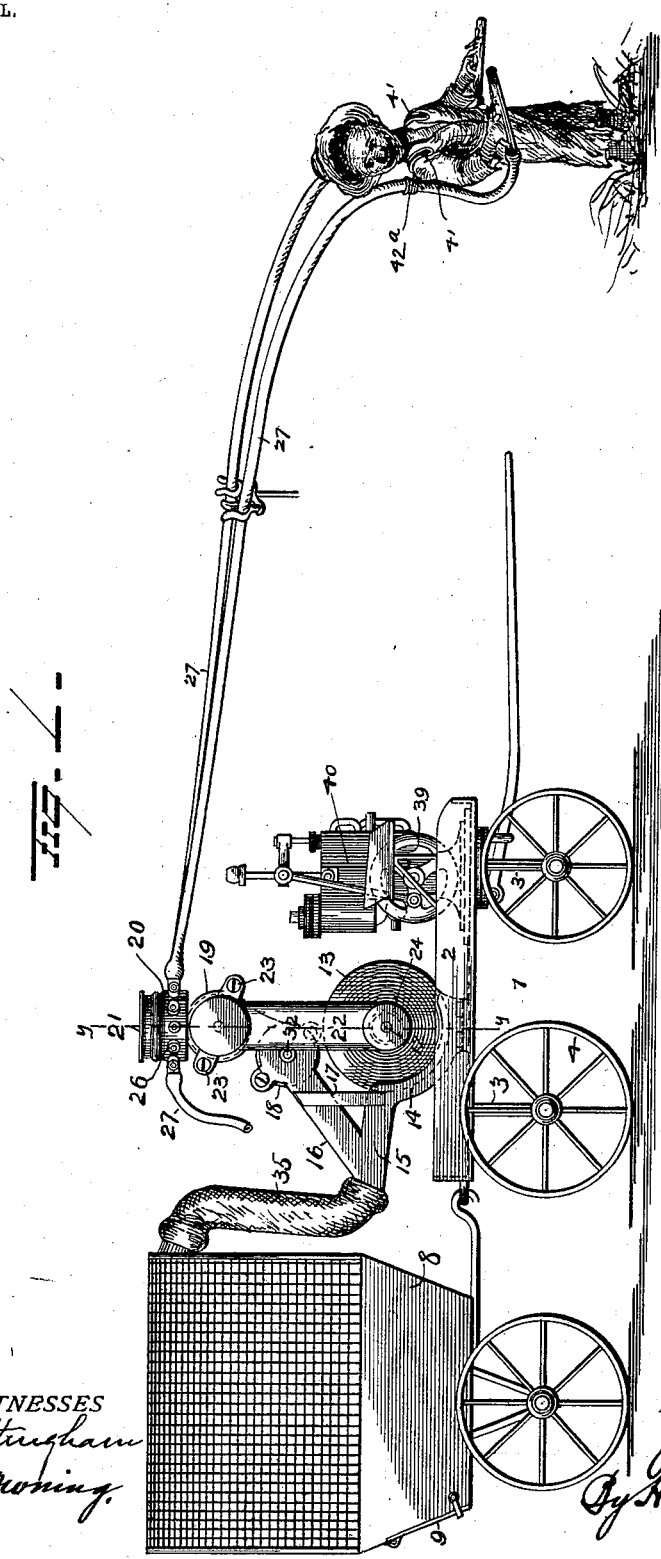
WITNESSES
INVENTOR

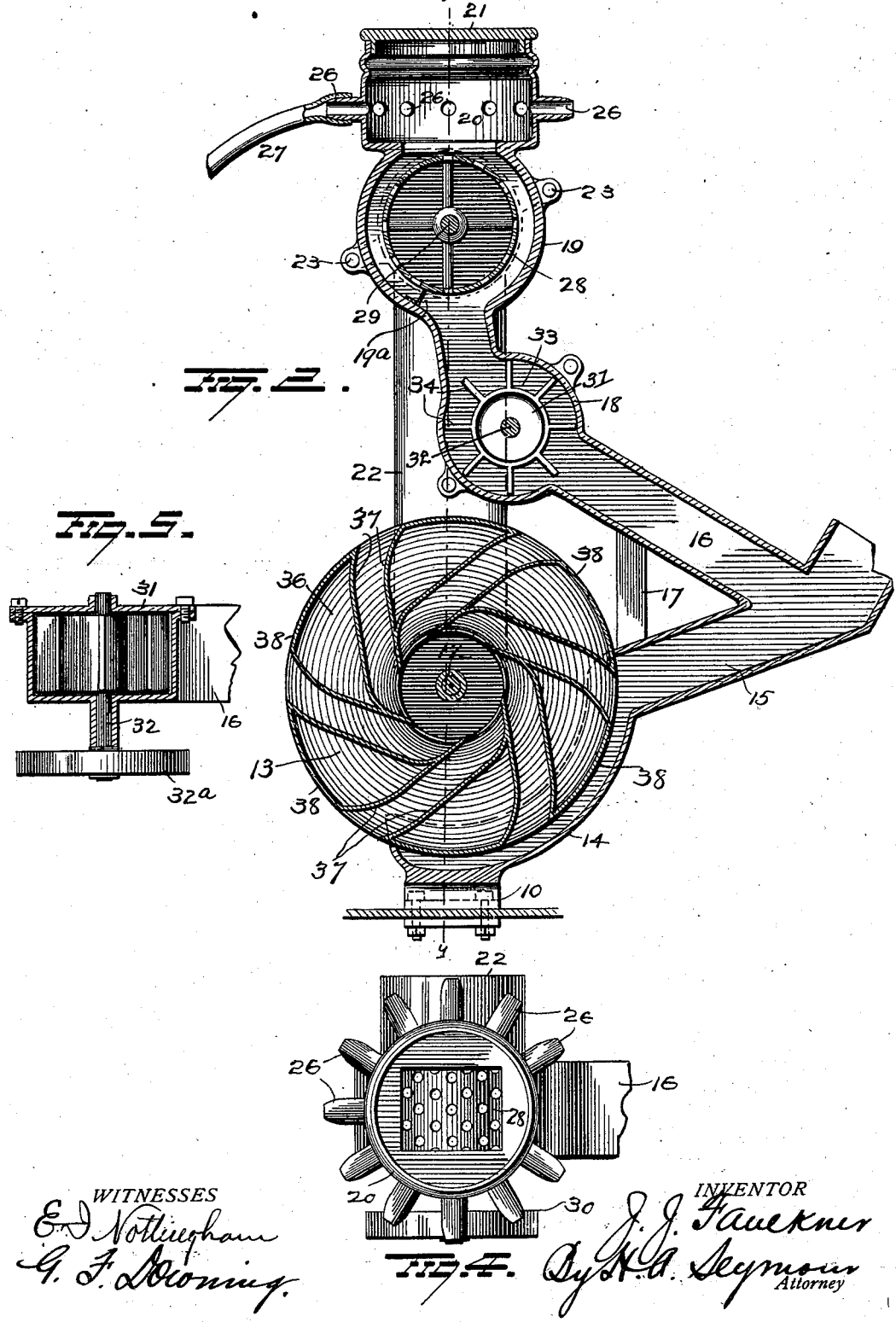

No. 723,997. PATENTED MAR. 31, 1903.
J. J. FAULKNER.
COTTON HARVESTER.
APPLICATION FILED JULY 20, 1901.
NO MODEL. 3 SHEETS—SHEET 3.
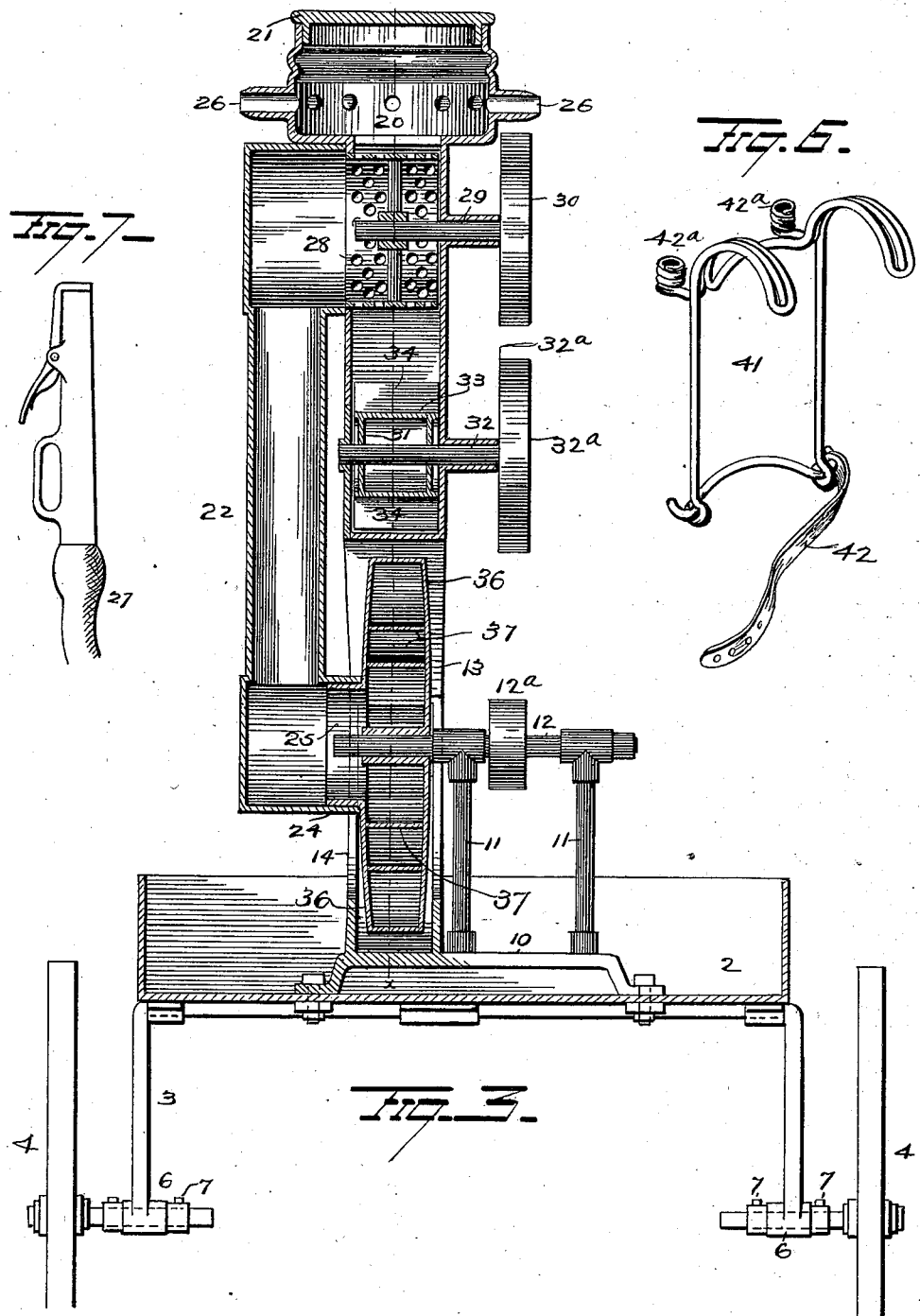
WITNESSES
E. J. Nottingham
G. F. Downing
INVENTOR
J. J. Faulkner
By H. A. Seymour
Attorney
THE NORRIS PETERS CO., PHOTO-LITHO., WASHINGTON, D. C.

UNITED STATES PATENT OFFICE.

JAMES J. FAULKNER, OF MEMPHIS, TENNESSEE.

COTTON-HARVESTER.

SPECIFICATION forming part of Letters Patent No. 723,997, dated March 31, 1903.

Application filed July 20, 1901. Serial No. 69,342. (No model.)

*To all whom it may concern:*

Be it known that I, JAMES J. FAULKNER, a resident of Memphis, in the county of Shelby and State of Tennessee, have invented certain new and useful Improvements in Cotton-Harvesters; and I do hereby declare the following to be a full, clear, and exact description of the invention, such as will enable others skilled in the art to which it appertains to make and use the same.

My invention relates to an improvement in cotton-harvesters, the object of the invention being to provide improved pneumatic operating mechanism to remove the cotton from the bolls and deposit it in a suitable receptacle provided for the purpose.

A further object is to provide improved mechanism for delivering the cotton into its receptacle in a comparatively clean condition.
A further object is to provide an improved fan which will require the minimum amount of power to run and the maximum suction and blast.

With these objects in view the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a sectional view on the line x x of Fig. 3. Fig. 3 is a section taken at right angles to Fig. 2 on the line y y of Figs. 1 and 2. Fig. 4 is a top view with parts removed. Fig. 5 is a sectional view showing the valve 31. Fig. 6 is a perspective view of the harness. Fig. 7 is a detail view of a picker.

1 represents a wagon having a body 2 mounted upon the arched axles 3, on which wheels 4 are mounted to hold the body sufficiently elevated to prevent its engagement with the cotton-plants, and these axles are preferably made in sections secured in suitable bearings 6 by set-screws 7, so as to adjust the wheels toward and away from each other to run between the rows of cotton. This adjustment is desirable, as the distance between the rows of cotton is governed by the condition of the soil, and if this adjustability were not provided for when the apparatus is moved from one locality to another it could not be used without detriment to the harvest.

Detachably connected to the rear of wagon 1 by a suitable tongue is another vehicle 8, preferably of the shape shown, for the reception of the cotton. This vehicle 8 is made with a screened cover to permit the escape of dust and dirt from the cotton and is supported on an adjustable axle similar in general construction to the axles 3, heretofore described. Only two wheels are provided on the vehicle 8 for convenience in dumping, and a hinged tail-gate 9 is located on the rear of said vehicle to permit the escape of the cotton therefrom.

On the wagon 1 my improved pneumatic motor and conveyer is secured and provided with a suitable bed-plate 10, secured to the bottom of the wagon by bolts or screws, as shown. On bed-plate 10 parallel uprights 11 are provided and made with bearings in their upper ends for a shaft 12, on which pulley 12ª is located, and at one end of said shaft a fan 13 is secured and provided with a segmental and tubular fan-casing 14, secured to or made integral with the bed-plate. This casing 14 follows the outline of the fan for a short distance and then extends rearward and slightly upward in the form of an angular blast-pipe 15, with the top of which a pipe 16 communicates, and is strengthened by a brace 17. At the upper end of pipe 16 a circular valve-chamber 18 is located and connected by a short pipe with a circular separating-chamber 19, above which latter the suction-chamber 20 is located and closed by a removable cap or cover 21. One side of separating-chamber 19 is closed by the enlarged end of a vertical suction-pipe 22, secured thereto by screws 23, the lower end of said pipe 22 made in the form of a bearing 24 to receive a circular flange 25 around a central opening in fan 13 and form a bearing for this side of the fan.

The suction-chamber 20, above referred to, is provided all around its side wall with nipples 26 for the attachment of rubber or other flexible tubes 27, the purpose of which will be hereinafter explained. From this suction-chamber 20 the cotton passes into separating-chamber 19, in which a perforated cylinder 28 is located, is open on one end, where it communicates with suction-pipe 22, and is secured on a shaft 29, projecting through the opposite side of chamber 19 and provided with a pulley 30 for rapidly revolving the cylinder, the suction through the perforations in said cylinder serving to remove the greater portion of the foreign matter, while the cotton is moved around the chamber by the revolution of the cylinder and falls into valve-chamber 18, a scraper 19$^a$ being provided in said suction-chamber to scrape the cotton from the cylinder. In valve-chamber 18 a rotary valve 31 is located and secured on a shaft 32, extending through one side of said chamber and provided with a pulley 32$^a$ for revolving the valve, the other side of said chamber closed by a removable plate to permit easy access to the valve. This valve comprises a cylindrical body 33, having a series of radially-disposed wings 34, engaging the wall of the casing, so as to always close the passage for air up through pipe 16, but at the same time convey the cotton around the chamber and drop it into pipe 16, down which it falls into blast-pipe 15, which latter is connected by a removable flexible tube 35 with a tubular projection on the upper forward end of vehicle 8 to convey the cotton therein when forced by the blast from fan 13, as will now be explained. This fan 13 comprises side disks 36, bulged at their center, having the fan-blades 37 secured between them, and the peripheries of said disks are connected by plates 38 to close the space between them with the exception of outlets for the air, and owing to this construction of fan there is but slight resistance offered to its rapid revolution, and hence the minimum of power is required to operate the same. As this fan discharges the air at its periphery, it must draw all its supply through the pipe 22, hence creating the necessary suction to pick the cotton and convey it through suction-chamber 20 and separating-chamber 19, and a sufficient portion of the air discharged by the fan is taken in by casing 14 and passes up pipe 15, where it comes in contact with the cotton which has fallen down pipe 16 and carries it up through tube 35 into vehicle 8, and it will be seen that owing to the screened covering over this vehicle the air is free to escape and carry with it dust and dirt drawn in with the cotton.

The pulleys 12$^a$, 30, and 32$^a$ are connected by belts with a driving-wheel 39 on a suitable engine 40, carried by wagon 1. This engine may be of any construction, but preferably one as light as possible, so as not to make the weight of the wagon too great.

The rubber or other flexible tubes 27, heretofore referred to, extend in all directions from the suction-chamber 20 and are provided at their free ends with suitable valves to close the passage of air through them when not being presented to the cotton. These tubes are carried by laborers, preferably two to a laborer, and are supported by a harness secured on the body of the laborer and comprising a frame 41, having hooks at its upper end to rest over the shoulders, a strap 42 to fasten around the body, and tubes or rings 42$^a$ on the ends of rearwardly-extending arms on the frame at or near the shoulders of the wearer to relieve his arms of the weight thereof and leave his hands free to operate the valves in the ends of the tubes when presented to the cotton. Suitable supports may be provided on the harness of the draft-animals, so as to hold tubes 27 out of the path of the animals.

It will be seen that my improvements not only utilize the suction of the fan for drawing the cotton into suction-chamber 20, but also utilize the blast from said fan to force the cotton into the rear vehicle, and owing to the revolving of perforated cylinder 28 in chamber 19 the free passage of air to the fan is not interfered with by the cotton as the latter is rapidly carried around the cylinder and dropped into valve-chamber 18.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a cotton-harvester, the combination with a receptacle for cotton, of a suction-chamber, means for conveying cotton to the latter, and a single fan communicating with said suction-chamber and cotton-receptacle and operating to draw cotton into the former and force it into the latter.

2. In a cotton-harvester, the combination with a suction-chamber and means for conveying cotton thereto, of a separating-chamber communicating with the suction-chamber, a discharge-outlet communicating with the separating-chamber, a fan for blowing air through said discharge-outlet, and a pipe communicating at one end with the separating-chamber and at the other end with the said fan, whereby air and cotton are drawn through the suction and separating chambers.

3. In a cotton-harvester, the combination with a suction-chamber, a fan communicating therewith, a discharge-pipe communicating with the fan, a pipe for conveying cotton from the suction-chamber to the discharge-pipe, and a rotary valve in said pipe for discharging cotton downwardly therethrough and preventing the upward passage of air.

4. In a cotton-harvester, the combination with a cotton-receptacle, a suction-chamber and means for conveying cotton to the latter, of a discharge-pipe, means for conveying cotton from the suction-chamber to the discharge-pipe and a fan communicating with the suction-chamber and also with the discharge-pipe so as to receive air from the former and discharge air through the latter.

5. In a cotton-harvester, the combination with a fan, a cotton-receptacle and a discharge-pipe communicating with said fan and cotton-receptacle, of a suction-chamber communicating with the same fan, a separating-chamber communicating with the suction-chamber, and a pipe connecting said separating-chamber with the discharge-pipe.

6. In a cotton-harvester, the combination with a fan, a cotton-receptacle and a discharge-pipe communicating with said fan and cotton-receptacle, of a suction-chamber communicating with the same fan, a separating-chamber communicating with the suction-chamber, a pipe connecting the separating-chamber with the discharge-pipe and a rotary valve in said connecting-pipe.

7. In a cotton-harvester, the combination with a fan, a cotton-receptacle and a discharge-pipe communicating with said fan and cotton-receptacle, of a suction-chamber communicating with the same fan, a separating-chamber communicating with the suction-chamber, a perforated cylinder mounted to rotate in the separating-chamber, and a pipe connecting the separating-chamber with the discharge-pipe.

8. In a cotton-harvester, the combination with a fan, a cotton-receptacle and a discharge-pipe communicating with said fan and cotton-receptacle, of a suction-chamber, a separating-chamber below the suction-chamber and communicating therewith, a pipe connecting the separating-chamber with the same fan, a perforated cylinder mounted to rotate in the separating-chamber and communicating with said last-mentioned pipe, and a pipe connecting the separating-chamber with the discharge-pipe.

9. In a cotton-harvester, the combination with a fan, a cotton-receptacle and a discharge-pipe communicating with said fan and cotton-receptacle, of a suction-chamber, a separating-chamber communicating with the suction-chamber, a pipe connecting the separating-chamber with the same fan, a perforated cylinder mounted to rotate in the separating-chamber, a scraper between the wall of the separating-chamber and said cylinder, and a pipe connecting the separating-chamber with said discharge-pipe.

10. In a cotton-harvester, the combination with a fan, a cotton-receptacle and a discharge-pipe connecting the fan with the cotton-receptacle, of a suction-chamber, a series of perforated nipples communicating therewith and projecting radially therefrom, pipes connected with said nipples, harness for supporting said pipes on the persons of the users, a separating-chamber communicating with the suction-chamber, a pipe connecting the separating-chamber with the same fan and a pipe connecting said separating-chamber with the discharge-pipe.

In testimony whereof I have signed this specification in the presence of two subscribing witnesses.

JAMES J. FAULKNER.

Witnesses:
J. E. WADDELL,
W. F. SIMONTON.